United States Patent [19]

Coffinberry

[11] Patent Number: 4,550,561
[45] Date of Patent: Nov. 5, 1985

[54] METHOD FOR IMPROVING THE FUEL EFFICIENCY OF A GAS TURBINE ENGINE

[75] Inventor: George A. Coffinberry, West Chester, Ohio

[73] Assignee: The United States of America as represented by the Administrator of the National Aeronautics and Space Administration, Washington, D.C.

[21] Appl. No.: 413,101

[22] Filed: Aug. 30, 1982

Related U.S. Application Data

[62] Division of Ser. No. 132,364, Mar. 20, 1980, Pat. No. 4,404,793.

[51] Int. Cl.⁴ .............................................. F02C 6/08
[52] U.S. Cl. .................................. 60/39.02; 60/39.07; 60/736
[58] Field of Search ............... 60/38.07, 39.183, 39.02, 60/39.142, 736; 98/1.5

[56] References Cited

U.S. PATENT DOCUMENTS

| | | | |
|---|---|---|---|
| 2,637,984 | 5/1953 | Bloomberg | 62/123 |
| 2,691,274 | 10/1954 | Whitney, Jr. | 62/6 |
| 3,158,197 | 11/1964 | Blezard | 165/40 |
| 3,537,513 | 11/1970 | Austin et al. | 165/70 |
| 3,547,380 | 12/1970 | Kappus et al. | 244/55 |
| 3,623,546 | 11/1971 | Banthin et al. | 165/51 |

FOREIGN PATENT DOCUMENTS

| | | |
|---|---|---|
| 1559828 | of 0000 | United Kingdom . |
| 741433 | 12/1955 | United Kingdom . |
| 742270 | 12/1955 | United Kingdom . |
| 781758 | 8/1957 | United Kingdom . |
| 797360 | 7/1958 | United Kingdom . |
| 859479 | 1/1961 | United Kingdom . |

OTHER PUBLICATIONS

"Preliminary Analysis of Aircraft Fuel Systems for Use with Broadened Specification Jet Fuels," Pasion and Thomas, Final Report, May 1976 (Cover, pp. 3, 31, 45, 46, 47, 59, 61).

"High-Freezing-Point Fuels Used for Aviation Turbine Engines" Friedman, Mar. 1979 (Cover, pp. 6, 8, 9).

Primary Examiner—Louis J. Casaregola
Attorney, Agent, or Firm—Gregory A. Welte; Derek P. Lawrence; John R. Manning

[57] ABSTRACT

An energy recovery system is provided for an aircraft gas turbine engine of the type in which some of the pneumatic energy developed by the engine is made available to support systems such as an environmental control system. In one such energy recovery system, some of the pneumatic energy made available to but not utilized by the support system is utilized to heat the engine fuel immediately prior to the consumption of the fuel by the engine. Some of the recovered energy may also be utilized to heat the fuel in the fuel tanks. Provision is made for multi-engine applications wherein energy recovered from one engine may be utilized by another one of the engines or systems associated therewith.

4 Claims, 3 Drawing Figures

METHOD FOR IMPROVING THE FUEL EFFICIENCY OF A GAS TURBINE ENGINE

The invention herein described was made in the performance of work under a NASA contract and is subject to the provisions of Section 305 of the National Aeronautics and Space Act of 1958, Public Law 85-568 (72 Stat. 435; 42 USC 2457).

This is a division of application Ser. No. 132,364 filed Mar. 20, 1980 now U.S. Pat. No. 4,404,793.

BACKGROUND OF THE INVENTION

The present invention relates to apparatus and techniques for improving the efficiency of a gas turbine engine, and more particularly, to such apparatus and techniques which recover pneumatic thermal energy from the engine and utilize such recovered energy to heat the engine fuel.

Modern conventional gas turbine engines, such as the one generally designated 10 in FIG. 1 include, inter alia, a fuel flow controlled by a fuel control valve 12. The engine 10 is provided with various engine bleeds, shown schematically in FIG. 1 as arrows A, B. The engine bleed of a conventional engine represents various points at which pneumatic energy developed by the engine is tapped, or bled, for particular purposes. In FIG. 1, Bleed A is representative of fan air; Bleed $B_1$ is representative of mid-stage compressor air; and Bleed $B_2$ is representative of compressor discharge air. Typical cruise temperature and pressure characteristics of such gas turbine engines for aircraft applications are: A=81° F., 8 psia; $B_1$= 596° F., 57 psia; and $B_2$=948° F., 178 psia; respectively.

Various bleed lines may be employed for engine cooling purposes. Such engine bleed air is often utilized by support systems which are necessary in conventional aircraft. For example, such support systems may include an air supply system which provides airframe anti-icing air, engine cowl anti-icing air, and cabin environmental control system (ECS) air. This air supply system generally must output air within a predetermined temperature range, e.g., 425° F. with anti-icing and 350° F. without anti-icing. To maintain this temperature, one technique bleeds engine fan air (Bleed A) into an air-to-air heat exchanger. Compressor air (Bleed B) is also bled and directed through the air-to-air heat exchanger and cooled by the fan air to the appropriate temperature. The fan air is typically dumped overboard. This type of system is undesirable in that it results in a reduction in engine fuel efficiency due to unrecovered thermal energy from the compressor bleed air as well as the loss of engine fan air which would otherwise be available as engine thrust.

Further, it is well known that the availability of gas turbine fuel is limited to only a narrow spectrum of the distillate of already scarce petroleum crude. Thus, it would be desirable to provide a gas turbine engine which could efficiently operate on a wider spectrum of fuel distillates. One problem with such "wide spectrum" fuels is that such fuels exhibit a relatively higher freezing point, requiring some means for fuel tank heating.

Accordingly, it is a general object of this invention to provide a gas turbine engine having improved fuel efficiency.

Another object of this invention is to provide an energy recovery system for such a gas turbine engine which includes a support system in which some of the thermal energy made available to but not utilized by the support system is recovered and utilized to heat the engine fuel.

Another object of this invention is to provide such an energy recovery system in which some of the recovered energy is utilized to heat the fuel in the fuel tank.

Another object of this invention is to provide such an energy recovery system in which the recovered energy is selectively utilized to heat the engine fuel and/or the fuel in the fuel tank.

Another object of this invention is to provide such a gas turbine engine with reduced fan bleed.

SUMMARY OF THE INVENTION

In one form of my invention, I provide an energy recovery system for a gas turbine engine of the type including means for supplying a flow of fuel thereto and having at least one support system in which some of the pneumatic energy developed in the engine is made available to the support system. Means is provided for recovering at least some of the pneumatic thermal energy made available to but not utilized by the support system. Means is provided for utilizing at least some of the energy recovered to heat the engine fuel substantially immediately prior to the consumption of the fuel by the engine.

BRIEF DESCRIPTION OF THE DRAWINGS

While the specification concludes with the claims particularly pointing out and distinctly claiming that which is regarded as the present invention, the objects and advantages of this invention can be more readily ascertained from the following description of preferred embodiments, when read in conjunction with the appended drawings in which:

DETAILED DESCRIPTION OF THE INVENTION

Figure 2:
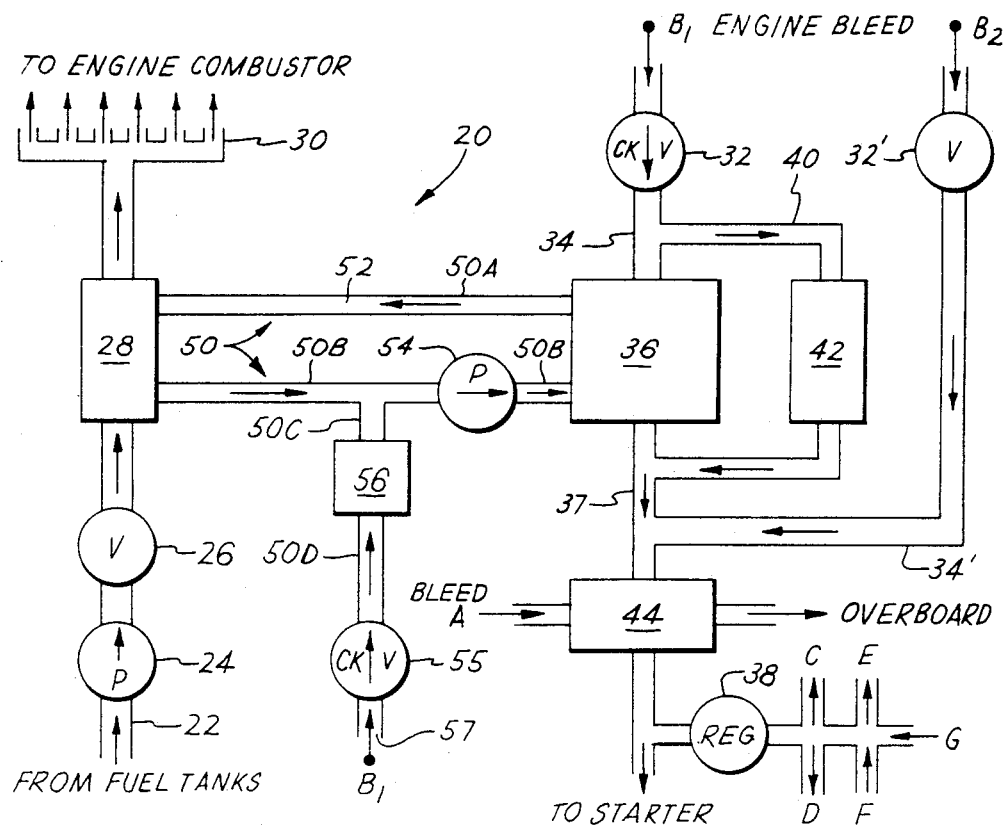
FIG. 2 is a schematic representation of one form of the energy recovery system of the present invention utilized to heat the engine fuel immediately prior to its consumption by the engine.

One form of energy recovery system of the present invention, generally designated 20, is shown in FIG. 2. The energy recovery system 20 includes a fuel line 22 which receives engine fuel from a fuel tank (not shown). The fuel is pumped by pump 24 and the flow therethrough is controlled by control valve 26. The output of control valve 26 represents the desired fuel flow to the engine combustor (not shown). At the output of control valve 26, the fuel is preferably in a relatively high pressure condition, e.g., 100 to 1200 psig. The output of control valve 26 is coupled to conventional first liquid-to-liquid heat exchanger 28, the function of which will be described hereinafter. After passing through the heat exchanger 28, the relatively high pressure fuel is then directed to a plurality of fuel nozzles 30, and then to the engine combustor.

Referring now to the engine bleeds, in one form of the invention, engine Bleed $B_1$, representing mid-stage compressor bleed, is coupled to conduit 34. For reasons which will be more fully understood later, conduit 34 includes check valve 32 for preventing backflow of engine higher pressure Bleed$_2$ to engine Bleed B$_1$. The output of valve 32 is then coupled through conduit 34 into conventional second air-to-liquid heat exchanger 36, the function of which will be described hereinafter. The output of second heat exchanger 36 is directed through conduit 37 to various support systems. For example, one output may represent the engine air turbine starter. Other support systems utilized may require a pressure regulator 38 so as to insure a proper pressure, e.g., 40 psig thereto. An output signal of the pressure regulator 38 may be employed to activate compressor discharge bleed valve 32' when the pressure drops below the proper level, e.g., 40 psig during low engine power settings. The bleed flow from pressure regulator 38 may be supplied to support systems such as wing anti-ice, designated C, and cowl anti-ice, designated D. Similarly, the bleed flow may also be provided to the aircraft environmental control system, designated E, of the type employed for cabin air conditioning. As will be more fully discussed later, the output of heat exchanger 36 through conduit 37 may also include inputs F, G, representing pneumatic energy outputs of other apparatus, e.g., other aircraft engines in a multi-engine aircraft application, or an auxiliary power unit.

Typically, another conduit 34' and previously mentioned control valve 32' are provided to receive the compressor discharge Bleed B$_2$. Preferably, the conduit 34' is positioned to bypass heat exchanger 36 because, as will be more fully understood later, in the recovery system 20, the relatively high pressure Bleed B$_2$ is usually not needed to heat the engine fuel. Indeed, in the recovery system 20, Bleed B$_2$ is generally needed only at low power settings for proper operation of the support system.

The first and second heat exchangers 28, 36, respectively, are coupled to each other by conduit 50. Conduit 50 includes conduit 50A, and 50B, which provide a path for a circulating heat transfer medium 52, such as a combination of water and an anti-freeze such as propylene glycol. Conduit 50B is further coupled to receive pressurization from an accumulator 56. In this connection, accumulator 56 is coupled to conduit 50B through conduit 50C. The accumulator 56 is adapted to receive a pressure input thereto at 57. Conduit 50B includes at least one conventional fluid pump 54. The pump 54 functions to circulate the heat transfer medium in the direction shown by the arrows in conduit 50.

The operation of the energy recovery system 20 of FIG. 2 will now be described. The accumulator 56 is activated to pressurize the heat transfer medium in the conduit 50. Preferably, this pressurization may be accomplished, in an aircraft application, by employing, for example, the mid-stage compressor pressure (Bleed B$_1$ of FIG. 1) at the input 57 of the accumulator 56. With this technique, in an aircraft application, the appropriate pressurization may be accomplished simply through the takeoff procedure when pressure of Bleed B$_1$ is at its highest value, e.g., 121 psig. Further, check valve 55 is typically provided in conduit 50D such that this appropriate pressure is maintained.

Figure 1:
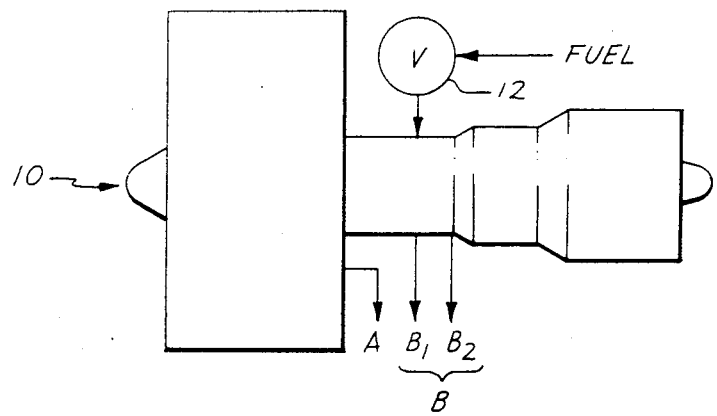
FIG. 1 is a highly simplified schematic representation of one form of Prior Art gas turbine engine to which the present invention relates.

During the operation of the engine 10 of FIG. 1, a flow of fuel is passing from control valve 26 in conduit 22 through heat exchanger 28 and then to the engine combustor (not shown in FIG. 2). The pump 54 provides the desired flow of heat transfer medium 52. During cruise and high power operation of the engine, relatively hot engine Bleed B$_1$ is directed through conduit 34, 37 to the previously mentioned support systems. Similarly, during low power operation of the engine, Bleed B$_2$ is directed through conduit 34', 37 and then to the support systems. However, as previously mentioned, it has heretofore been the practice to generally lose whatever thermal energy was made available to but not used by the support systems. In the heat recovery system 20, however, the pneumatic thermal energy which would otherwise be lost is utilized in heat exchanger 36 to heat the heat transfer medium 52 which flows through the heat exchanger 36. Thus, the heat transfer medium 52 is directed by conduit 50B into heat exchanger 36 where it is heated by Bleed B$_1$ and then directed out through conduit 50A. The now-heated heat transfer medium 52 is then utilized by heat exchanger 28 to heat the relatively high pressure fuel at a point substantially immediately prior to its consumption by the engine. By a point substantially immediately prior to its consumption by the engine, it is meant at a point in the fuel flow wherein the fuel is in a relatively high pressure condition of 100 to 1200 psig. It is to be appreciated that the heat recovery system 20 of FIG. 2 serves to recover some of the energy which would otherwise have been lost and to direct such energy to heat the fuel, immediately prior to its consumption, thereby increasing the fuel efficiency of the engine.

To control the temperature of the air and fuel, it is desirable to provide certain provisions for limiting the aforementioned heat transfer to the fuel. One such control means is shown in FIG. 2. For example, bypass 40 is controlled by bypass control means 42 and functions to simply bypass, or partially bypass, the heat exchanger 36. Bypass control 42 may, for example, be responsive to the temperature of the fuel or of the heat transfer medium 52 and may operate, i.e., bypass when the fuel and/or heat transfer medium 52 reaches an unacceptably high temperature level. If desired, bypass control 42 may operate also under the condition in which the engine bleed air temperatures are undesirably low or the pressure loss through heat exchanger 36 is undesirably high. This type of operation may be desirable to insure proper pneumatic energy, e.g., temperature and pressure, for the appropriate support systems. Similarly, for those instances in which the available pneumatic energy is still undesirably great, or when using compressor Bleed B$_2$, energy discharge means 44 may be provided. One form of such energy discharge means 44 may comprise a conventional air-to-air heat exchanger where engine fan Bleed A is employed. The energy discharge means 44 may simply operate to discharge the excess pneumatic thermal energy in the normal manner.

Particularly preferable in the operation of the heat recovery system 20 is an integrated control means for maximizing the improvement in efficiency. Such control may take the form of conventional hydromechanical and/or electronic controls, including digital and analog forms.

Figure 3:
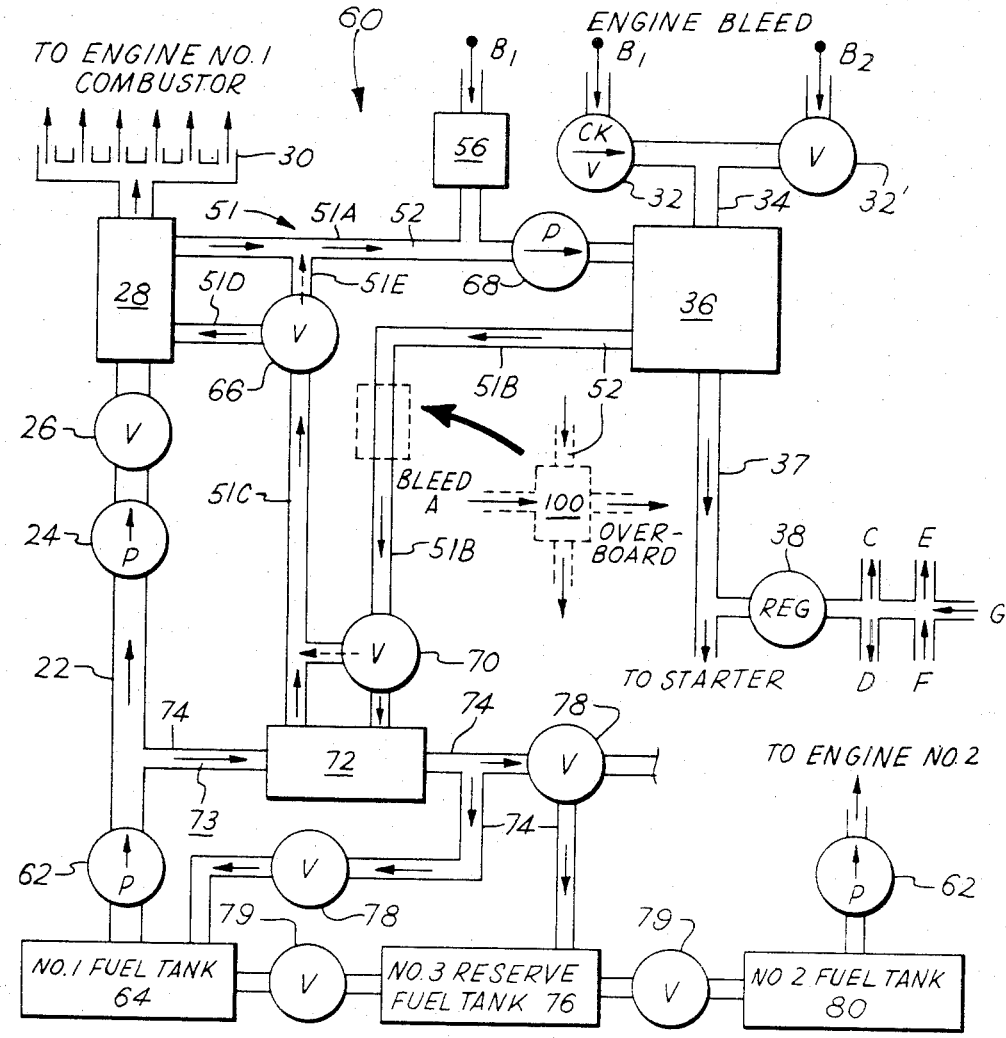
FIG. 3 is a schematic representation of another form of the energy recovery system of the present invention in which the recovered energy is selectively utilized to heat the engine fuel and/or the fuel in the fuel tank.

Another form of energy recovery system 60 of the present invention is shown in FIG. 3. The energy recovery system 60 is related to the energy recovery system 20 of FIG. 2 so that, whenever possible, like reference numerals have been used to designate like elements.

In addition to the utilization of the recovered pneumatic energy to heat the high pressure fuel to the engine, the energy recovery system 60 also includes means for heating the fuel in the fuel tanks and is particularly suited for aircraft applications. In this connection, exemplary fuel tanks 64, 76, 80 are shown. Fuel tank 64 is intended to represent the No. 1 fuel tank for supplying the No. 1 engine. Fuel tank 76 may represent a No. 3 reserve fuel tank and fuel tank 80 may represent a No. 2 fuel tank intended primarily to supply an engine No. 2 (not shown). The fuel from fuel tank 64 is pumped by fuel tank pump 62 through conduit 22 into high pressure pump 24 whose ouput is controlled by control valve 26. This high pressure fuel then passes through heat exchanger 28 and then to engine No. 1 combustor, as previously described in connection with the energy recovery system 20 of FIG. 2. Instead of the use of single Bleed $B_1$, as in the system 20, both engine Bleeds $B_1$, $B_2$ are processed by heat exchanger 36 and outputted through conduit 37, eventually to support systems, as in FIG. 2.

Conduit 51 functions to couple heat exchangers 28, 36 and conventional third liquid-to-liquid heat exchanger 72, which is located in the aircraft portion of the system. More particularly, conduit 51A couples heat exchanger 28 to heat exchanger 36. Conduit 51B couples heat exchanger 36 to heat exchanger 72. Conduit 51C couples heat exchanger 72 to conduit 51D and 51E. Coupled between conduit 51C, conduits 51D, 51E, is a modulating two-way control valve 66. By a modulating two-way valve it is meant a valve having a single input which can provide any modulated combination of two outputs. Control valve 66 functions to couple conduit 51C to either conduit 51D, and then to heat exchanger 28, or to conduit 51E and then to 51A, thus bypassing heat exchanger 72. In the aircraft portion of the system, fuel line 22 is provided with a tap conduit 74. The tap conduit 74 is coupled to, and through, heat exchanger 72 and then through valves 78 back to fuel tank 64, or back to reserve fuel tank 76, or through a similar valve (not shown) back to fuel tank 80. Other conventional valves 79 may also be conveniently employed.

The operation of the energy recovery system 60 of FIG. 3 will now be described. In addition to the heat transfer loop between heat exchangers 28 and 36, as in the energy recovery system 20 of FIG. 2, the energy recovery system 60 provides the third heat exchanger 72 which functions to selectively heat a portion of the fuel in the fuel tanks.

More particularly, with control valves 66 and 70 in the position shown by the solid arrows in FIG. 3, the flow of the heat transfer medium 52 in the conduit 50 is as follows: starting with heat exchanger 28, the heat transfer medium 52 goes through pump 68 and then through conduit 51A to heat exchanger 36. As mentioned previously, heat exchanger 36 provides otherwise lost pneumatic thermal energy to the heat transfer medium 52. The now-heated heat transfer medium 52 is directed through conduit 51B and through valve 70 to third heat exchanger 72. The third heat exchanger 72 functions to transfer some of the heat from the heat transfer medium 52 to the fuel 73 in the fuel line tap conduit 74. Conduit 51C directs the heat transfer medium 52 to valve 66 to heat exchanger 28, wherein the fuel entering the engine combustor is heated. Thus, it is apparent that the otherwise lost energy is recovered by heat exchanger 36 and utilized to heat the fuel in the fuel tank and/or the relatively high pressure fuel immediately prior to its consumption by the engine. In aircraft applications, this heating effect is particularly desirable at subsonic speeds.

It is to be appreciated that when control valve 70 is placed in another position, such as the one shown by the dashed arrow, the fuel tank heating function can be completely removed and all of the recovered energy may be utilized to heat the fuel immediately prior to its consumption by the engine, maximizing engine fuel efficiency. Similarly, when control valve 66 is placed in another position, such as the one shown by a dashed arrow, all of the recovered energy in the heat exchanger 36 may be employed to heat the fuel in the fuel tank, maximizing tank heating. Further, as previously discussed, the control valves 66 and 70 are preferably of the modulating type wherein various degrees of engine fuel and fuel tank heating relationships may be provided. In the event that a significant amount of fuel tank heating is desired while normally using relatively lower temperature Bleed $B_1$, $B_2$ bleed air valve 32' may be opened. In this event, higher temperature Bleed $B_2$ will become available to heat the fuel tank. As in the heat recovery system 20 of FIG. 2, an integrated control of the energy recovery system 60 is generally desirable. Such integrated control may be digital or analog in nature.

Shown in phantom in FIG. 3 is another air-to-liquid neat exchanger 100 which may be useful for certain applications. For example, one such heat exchanger 100 may be placed in conduit 51B and positioned to receive fan Bleed A. More particularly, the heat exchanger 100 may be useful under conditions in which excess heat is present and/or too little fuel is present in the tank. Under such conditions, the heat exchanger 100 may be employed in a manner similar to the energy discharge means 44 of FIG. 2. Indeed, the heat exchanger 100 and/or the discharge means 44 may be employed, where appropriate. Further, the heat exchanger 100 may be useful following supersonic flight applications wherein fan Bleed air A can be used to cool engine compressor bleed air and/or tank fuel.

As mentioned previously, although the invention has been discussed in connection generally with a single engine, the invention is particularly desirable for use in connection with multi-engine applications wherein the recovery system couples such engines and/or fuel tanks so as to reduce the loss of pneumatic energy, resulting in improved engine efficiency. Further, as is evident to those skilled in the art, the system as described hereinbefore may be used to cool engine Bleed air $B_1$ and/or $B_2$ in those aircraft applications involving supersonic flight, wherein engine fan air Bleed A cannot normally be used because of the high temperature of the fan air. In this case, the system may be used to provide a means for cooling engine compressor bleed air while at the same time providing the other desirable advantages of the invention. Although the energy recovery system of the present invention is particularly applicable to aircraft applications, it is also applicable to other gas turbine applications, such as industrial and marine applications.

An advantage of the present invention is that, under a majority of operating conditions, the need to bleed fan air from the engine is eliminated, thus increasing the operating efficiency of the engine. Another advantage of the present invention is that the magnitude of ram air, e.g., air taken on board the aircraft used for additional cooling, is reduced. This is due to the fact that fan Bleed A is usually not employed so that the temperature of the air to the support systems can be reduced without a proportional loss in fan thrust. Further, this reduction in ram air employed yields additional aircraft efficiency, and hence, engine operating efficiency. Also, it is to be appreciated that the heat exchangers employed in the present invention may be conveniently separated in such a manner such that fuel cannot leak into the air system while facilitating installation and/or servicing on the engine and aircraft.

While the present invention has been described with reference to specific embodiments thereof, it will be obvious to those skilled in the art that various changes and modifications may be made without departing from the invention in its broader aspects. It is contemplated in the appended claims to cover all such variations and modifications of the invention which come within the true spirit and scope of my invention.

What is claimed as new and desired to be secured by Letters Patent of the United States is:

1. A method of recovering heat in a gas turbine engine which drives a fan in an aircraft, comprising:
    (a) tapping a first compressor bleed airstream, B1, having a first temperature;
    (b) tapping a second compressor bleed airstream, B2, having a second temperature higher than the first temperature;
    (c) transferring heat from B1 through a first heat exchanger and into an aqueous heat transfer medium;
    (d) transferring heat from the aqueous medium of (c) into high-pressure fuel having a pressure exceeding 500 psig;
    (e) bypassing some of B1 past the first heat exchanger of (c) when the temperature of the fuel of (d) reaches a predetermined level to thereby reduce heating of the high-pressure fuel;
    (f) mixing B2 with both the B1 which passed through the first heat exchanger and with the B1 which bypassed the first heat exchanger in order to provide a mixed airstream; and
    (g) directing some of the mixed airstream of (f) to one or more of the following engine suport components: wing anti-icer, cowl anti-icer, cabin air conditioner, or engine starter for absorption of heat from the mixed airstream prior to the overboard disposal of any significant amounts of B1 or B2 or the mixed B1 and B2 of (f).

2. A method according to claim 1 and further comprising the step of transferring heat out of the mixed airstream into the fan airstream when the heat absorbed by the fuel of (d) and by the components of (g) falls below a predetermined level.

3. A method according to claim 1 and further comprising the step of pressurizing the aqueous heat transfer medium by B1.

4. A method according to claim 1 and further comprising the step of controlling the tapping of B2 such that substantially no B2 is tapped when the engine power output exceeds a predetermined level.

* * * * *